US011275824B2

(12) United States Patent
Bengtson et al.

(10) Patent No.: US 11,275,824 B2
(45) Date of Patent: Mar. 15, 2022

(54) DETECTING CREDENTIAL COMPROMISE IN A CLOUD RESOURCE

(71) Applicant: Netflix, Inc., Los Gatos, CA (US)

(72) Inventors: William Bengtson, Campbell, CA (US); Scott Behrens, San Francisco, CA (US); Travis McPeak, Santa Clara, CA (US)

(73) Assignee: Netflix, Inc., Los Gatos, CA (US)

(*) Notice: Subject to any disclaimer, the term of this patent is extended or adjusted under 35 U.S.C. 154(b) by 287 days.

(21) Appl. No.: 16/402,213

(22) Filed: May 2, 2019

(65) Prior Publication Data
US 2019/0349369 A1    Nov. 14, 2019

Related U.S. Application Data

(60) Provisional application No. 62/756,460, filed on Nov. 6, 2018, provisional application No. 62/669,313, filed on May 9, 2018.

(51) Int. Cl.
*H04L 29/06* (2006.01)
*G06F 21/45* (2013.01)
(Continued)

(52) U.S. Cl.
CPC .......... *G06F 21/45* (2013.01); *H04L 63/0281* (2013.01); *H04L 63/0823* (2013.01);
(Continued)

(58) Field of Classification Search
CPC ..... H04L 63/0281; H04L 63/20; H04L 67/16; H04L 67/2833; H04L 63/0823;
(Continued)

(56) References Cited

U.S. PATENT DOCUMENTS 7,453,852 B2    11/2008    Buddhikot et al.
8,619,779 B2    12/2013    Li et al.
(Continued)

FOREIGN PATENT DOCUMENTS

CA        3 097 671 A1    11/2019
WO     2019/217595 A1    11/2019

OTHER PUBLICATIONS

Non-Final Office Action received for U.S. Appl. No. 16/393,958 dated Nov. 16, 2020, 41 pages.
(Continued)

*Primary Examiner* — Fatoumata Traore
*Assistant Examiner* — Thomas A Gyorfi
(74) *Attorney, Agent, or Firm* — FisherBroyles, LLP

(57) ABSTRACT

The disclosed computer-implemented method may include initializing a server instance using a specified network address and an associated set of credentials, logging the network address of the initialized server instance as well as the associated set of credentials in a data log, analyzing network service requests to determine that a different server instance with a different network address is requesting a network service using the same set of credentials, accessing the data log to determine whether the second server instance is using a network address that is known to be valid within the network and, upon determining that the second server instance is not using a known network address, preventing the second server instance from performing specified tasks within the network. Various other methods, systems, and computer-readable media are also disclosed.

20 Claims, 6 Drawing Sheets

(51) Int. Cl.
*H04L 67/51* (2022.01)
*H04L 67/566* (2022.01)

(52) U.S. Cl.
CPC .......... *H04L 63/0876* (2013.01); *H04L 63/10* (2013.01); *H04L 63/1491* (2013.01); *H04L 63/20* (2013.01); *H04L 67/16* (2013.01); *H04L 67/2833* (2013.01); *H04L 63/101* (2013.01)

(58) Field of Classification Search
CPC . H04L 63/0876; H04L 63/1491; H04L 63/10; H04L 63/101; H04L 63/107; H04L 67/18; H04L 63/1425; G06F 21/44; G06F 21/45
See application file for complete search history.

(56) References Cited

U.S. PATENT DOCUMENTS

| | | | |
|---|---|---|---|
| 9,288,193 B1* | 3/2016 | Gryb | ............... H04L 63/08 |
| 9,521,606 B1 | 12/2016 | Costa et al. | |
| 2010/0134299 A1 | 6/2010 | Fitzgerald et al. | |
| 2012/0042163 A1 | 2/2012 | Goodman et al. | |
| 2012/0173732 A1 | 7/2012 | Sullivan | |
| 2013/0219483 A1 | 8/2013 | Cho et al. | |
| 2014/0082350 A1 | 3/2014 | Zarfoss, III et al. | |
| 2014/0317738 A1* | 10/2014 | Be'ery | ............... H04L 63/16 726/23 |
| 2015/0095497 A1 | 4/2015 | Caputo et al. | |
| 2015/0121529 A1* | 4/2015 | Quinlan | ............... H04W 12/128 726/23 |
| 2015/0142968 A1 | 5/2015 | Bhagwat et al. | |
| 2016/0105489 A1 | 4/2016 | Llorca et al. | |
| 2017/0171229 A1* | 6/2017 | Arzi | ............... H04L 63/1408 |
| 2017/0230384 A1* | 8/2017 | Touboul | ............... H04L 63/102 |
| 2017/0339070 A1 | 11/2017 | Chang et al. | |
| 2017/0339186 A1 | 11/2017 | Gurvich et al. | |
| 2018/0007002 A1 | 1/2018 | Landgraf | |
| 2018/0115551 A1 | 4/2018 | Cole | |
| 2018/0316764 A1 | 11/2018 | Ferreira Gomes et al. | |
| 2019/0253453 A1* | 8/2019 | Vissamsetty | ............ H04L 63/20 |
| 2019/0347404 A1 | 11/2019 | Bengtson | |
| 2019/0349405 A1 | 11/2019 | Bengtson | |
| 2020/0053397 A1 | 2/2020 | Zhou | |
| 2020/0106748 A1 | 4/2020 | Newell et al. | |

OTHER PUBLICATIONS

International Preliminary Report on Patentability received for PCT Application Serial No. PCT/US2019/031387 dated Nov. 19, 2020, 9 pages.

International Search Report and Written Opinion received for PCT Application Serial No. PCT/US2019/031387 dated Jul. 12, 2019, 11 pages.

Bengtson, William, "Multilayered Approach To Protecting Cloud Credentials", U.S. Appl. No. 16/393,958 dated Apr. 25, 2019, 51 pages.

Bengtson, William, "Advanced Metadata Proxy", U.S. Appl. No. 16/402,210 dated May 2, 2019, 58 pages.

* cited by examiner

Data Log
600

| Server Instance | Credential Name | IP Block | TTL |
|---|---|---|---|
| 601 | ABC | 610 | 6 Hrs |
| 602 | DEF | 611 | 4.5 Hrs |
| 603 | GHI | 612 | 1 Hr |
| 604 | JKL | 613 | 0.2 Hrs |

*FIG. 6*

Data Log
700

| Server Instance | TTL |
|---|---|
| 701 | 5:58 |
| 702 | 5:17 |
| 703 | 4:52 |
| 704 | 4:03 |
| 705 | 3:15 |
| 706 | 3:13 |
| 707 | 2:21 |
| 708 | 1:37 |
| 709 | 0:45 |
| 710 | 0:06 |

Sliding Window
720

DETECTING CREDENTIAL COMPROMISE IN A CLOUD RESOURCE

CROSS REFERENCE TO RELATED APPLICATION

This application claims priority to and the benefit of U.S. Provisional Patent Application No. 62/756,460, filed Nov. 6, 2018, and also claims priority to U.S. Provisional Patent Application No. 62/669,313, filed May 9, 2018, the disclosures of each of which are incorporated, in their entirety, by this reference.

BACKGROUND

In many cases, software applications are installed locally on electronic devices. In other cases, software applications may be hosted on the cloud and may not be installed locally on the electronic devices, or those devices may only have small, client-side applications that allow access to the cloud. Each of these cloud-hosted applications may be hosted on different cloud instances. These cloud instances are often referred to as "virtual private clouds" or VPCs. Organizations may set up VPCs to host applications for their users. Those users typically log in to the VPCs, providing credentials such as usernames and passwords or biometric information. Once logged in, the users may be able to access data and other resources provided by the cloud-hosted application. In some cases, the user's credentials may be static and may be valid indefinitely. In other cases, the user's credentials may be temporary and may lose their validity after a predefined period (e.g., 1-6 hours). Once the user's credentials have lost their validity, any access to applications hosted on the VPCs will be denied.

SUMMARY

As will be described in greater detail below, the present disclosure describes methods and systems for detecting credential compromise in a cloud server instance. In one example, a computer-implemented method for detecting credential compromise in a cloud server instance may include initializing a server instance using a specified network address and an associated set of credentials, logging the network address of the initialized server instance as well as the associated set of credentials in a data log, analyzing network service requests to determine that a different server instance with a different network address is requesting a network service using the same set of credentials, accessing the data log to determine whether the second server instance is using a network address that is known to be valid within the network and, upon determining that the second server instance is not using a known network address, preventing the second server instance from performing various tasks within the network.

In some examples, the server instance may be configured to maintain a set of network addresses that are known to be valid within the network. In some examples, the set of network addresses that are known to be valid within the network may include multiple network addresses that were stored in the data log during a specified timeframe. In some examples, the specified timeframe may be continually updated such that those network addresses that are stored in the data log are stored within a sliding window of history.

In some examples, the data log may be configured to store, for each server instance, a credential name, an internet protocol (IP) block and/or a time-to-live (TTL) value. In some examples, the set of credentials associated with the initialized server instance may include static credentials or temporary credentials. In some examples, the server instance may be initialized using a temporary network address and may be transitioned to a static, public-facing network address.

In some examples, the method may further include associating the temporary network address with the static, public-facing network address and approving the static, public-facing network address as a known valid network address. In some examples, the method may also include creating a network address table that allows network addresses to have at least one deviation from the network address stored in the data log. In some examples, the server instance may allow multiple different network addresses from the same server instance for at least a specified time frame.

In some examples, the data log may include real-time data, such that the method step of accessing the data log to determine whether the second server instance is using a network address that is known to be valid within the network is performed using real-time data. In some examples, the data log may include historical data, such that the method step of accessing the data log to determine whether the second server instance is using a network address that is known to be valid within the network is performed using stored historical data.

In some examples, the method may further include generating a honeytoken credential and placing that honeytoken credential on the server instance. In some examples, the method may further include tracking usage of the honeytoken credential, so that upon an initial use by a server instance or application, various portions of information tied to the server instance or application may be recorded. In some examples, the method may also include providing a null response or providing a response with fictitious data to evaluate how the fictitious data is used.

In some examples, the method may further include issuing certificates for honeypot services and hosting the honeypot services on a custom application. In some examples, the method may also include determining that a server instance or application has made a call to at least one of the honeypot services hosted on the custom application and alerting various entities of the call made to the honeypot service by the server instance or application. In some examples, the method may also include replying to the call to the honeypot services. In some cases, the reply may be dependent on the type of service to which the call was made.

In addition, a corresponding system for detecting credential compromise in a cloud server instance may include at least one physical processor and physical memory comprising computer-executable instructions that, when executed by the physical processor, cause the physical processor to initialize a server instance using a specified network address and an associated set of credentials, log the network address of the initialized server instance as well as the associated set of credentials in a data log, analyze network service requests to determine that a different server instance with a different network address is requesting a network service using the same set of credentials, access the data log to determine whether the second server instance is using a network address that is known to be valid within the network and, upon determining that the second server instance is not using a known network address, prevent the second server instance from performing various tasks within the network, and/or raise an alert.

In some examples, the above-described method may be encoded as computer-readable instructions on a computer-readable medium. For example, a computer-readable medium may include one or more computer-executable instructions that, when executed by at least one processor of a computing device, may cause the computing device to initialize a server instance using a specified network address and an associated set of credentials, log the network address of the initialized server instance as well as the associated set of credentials in a data log, analyze network service requests to determine that a different server instance with a different network address is requesting a network service using the same set of credentials, access the data log to determine whether the second server instance is using a network address that is known to be valid within the network and, upon determining that the second server instance is not using a known network address, prevent the second server instance from performing various tasks within the network, and/or raise an alert.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 6 illustrates an embodiment of a data log in which information related to different server instances is stored.

Figure 1:
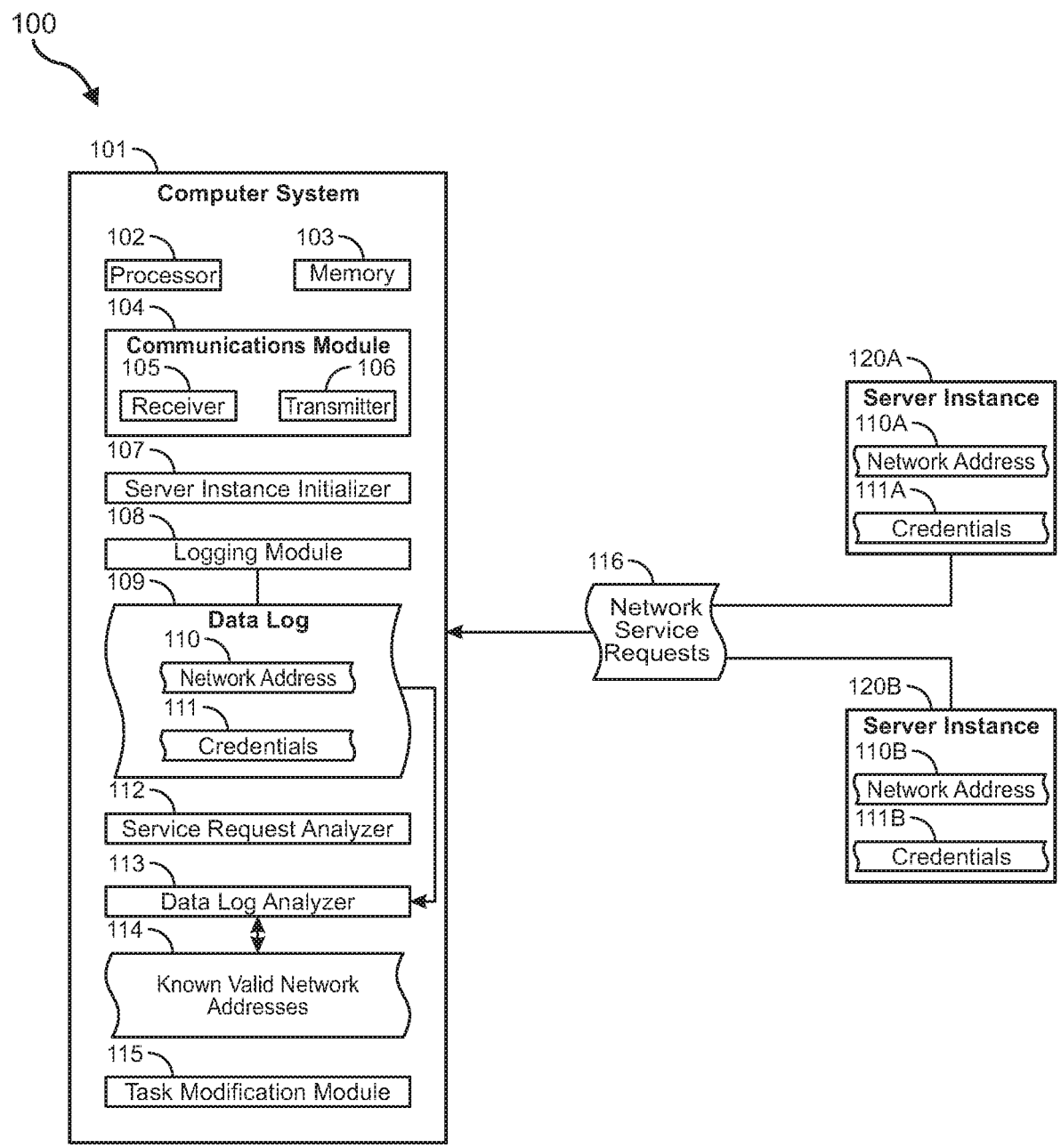
FIG. 1 illustrates a computing environment in which embodiments described herein may be implemented.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to detecting credential compromise in a cloud server instance. As will be explained in greater detail below, embodiments of the present disclosure may initialize a server instance using a specified network address and an associated set of credentials. The embodiments may also log the network address of the initialized server instance as well as the associated set of credentials in a data log, analyze network service requests to determine that a different server instance with a different network address is requesting a network service using the same set of credentials, access the data log to determine whether the second server instance is using a network address that is known to be valid within the network and, upon determining that the second server instance is not using a known network address, prevent the second server instance from performing various tasks within the network.

In at least some traditional cloud-hosting systems, VPC providers may allow requests for resources to come from many different server instances located throughout the network. Each server instance may supply a set of credentials when requesting cloud resources. However, some malicious users may attempt to hijack a set of server credentials and use those credentials from different server instances. If the malicious user were to gain control of valid credentials in such traditional systems, the user may cause different server instances to request and receive cloud resources using the same set of credentials (at least until those credentials expire). The credentials may be used, for example, to access cloud resources including application data, database tables, or other private information. As such, it may be beneficial to keep a log of server instances and determine which instances are using which credentials. By monitoring the log for inconsistencies between server instances and associated credentials, the systems described herein may reduce the number of potentially malicious users/devices that have access to cloud systems and cloud-stored information. This may, in turn, keep legitimate user's data more secure and out of the hands of unwanted users.

The following will provide, with reference to FIGS. 1-8, detailed descriptions of systems and methods for detecting credential compromise in a cloud server instance. FIG. 1, for example, illustrates a computing environment 100 that includes a computer system 101. The computer system 101 may be substantially any type of computer system including a local computer system or a distributed (e.g., cloud) computer system. The computer system 101 may include at least one processor 102 and at least some system memory 103. The computer system 101 may include program modules for performing a variety of different functions. The program modules may be hardware-based, software-based, or may include a combination of hardware and software. Each program module may use computing hardware and/or software to perform specified functions, including those described herein below.

For example, the communications module 104 may be configured to communicate with other computer systems. The communications module 104 may include any wired or wireless communication means that can receive and/or transmit data to or from other computer systems. These communication means may include hardware radios including, for example, a hardware-based receiver 105, a hardware-based transmitter 106, or a combined hardware-based transceiver capable of both receiving and transmitting data. The radios may be WIFI radios, cellular radios, Bluetooth radios, global positioning system (GPS) radios, or other types of radios. The communications module 104 may be configured to interact with databases, mobile computing devices (such as mobile phones or tablets), embedded or other types of computing systems.

The computer system 101 may further include a server instance initializer 107 that is configured to initialize various server instances including server instances 120A and 120B. The server instances 120A/120B may be virtual private clouds (VPCs) or other types of servers or computer systems. Each server instance may be initialized with a specified network address 110A/110B and a specified set of credentials 111A/111B. In many cases, each server instance may be assigned its own set of credentials. In some embodiments, however, a server instance (e.g., 120B) may attempt to use the set of credentials (e.g., 111A) that was assigned to another server instance (e.g., 120A). These credentials may be logged in a data log 109 by logging module 108 of computer system 101. The data log 109 may note which network address 110 and which credentials 111 were included or identified in the network service request 116.

The service request analyzer 112 may analyze the network service requests 116 that come in from the various server instances (e.g., from 120A, 120B, and potentially from others not shown). The service request analyzer 112 may determine, for example, which server instance sent the network service request 116, which network address 110 is associated with that server instance, and which credentials 111 are associated with that server instance. Based on this information, the data log analyzer 113 of computer system 101 may then determine whether the identified network address and credentials (e.g., 110A and 111A, respectively) fit within a set of known valid network addresses 114. If the network address does not match the known valid addresses, or if the credentials were known to have been used in association with a different server instance, then the task modification module 115 may limit the tasks that can be performed by that server instance. In some cases, the tasks may be severely restricted such that the server instance is prohibited from performing any tasks at all. In other cases, the tasks may be more moderately restricted, such that the server instance can perform some limited tasks but may be restricted from performing other tasks such as accessing private data.

The term "credential," as referred to herein, may refer to a web services application programming interface (API) credential that is used to describe and make changes within a web services account. These credentials may be used on an elastic computing cloud instance or other type of server instance. Some web services providers may provide an ability to assign permissions to an instance through an identity and access management (IAM) role. This IAM role may be attached to cloud server instance through an instance profile, thus providing credentials to the underlying applications running on the server instance. A cloud logging service may be provided by the web service provider which may be configured to log API calls that are made using a specified set of credentials in order to enable governance, compliance, and auditing. The cloud logging service may provide the ability to see which calls were made within an account and from which locations the calls were made. Actions may be logged regardless of whether the actions are performed through a web services management console, through web service provider software development kits (SDKs), through web services operating on behalf of the server instances, or through web service provider command line tools.

At least some of the embodiments described herein that are directed to detecting credential compromise may be configured to detect use of a credential from an IP address that is not assigned to a given user's or a given account's assigned resources (e.g., an assigned IP block). The ability to describe an environment may enable understanding of which IPs are currently assigned to a given environment. At least some of the embodiments described herein may implement a sliding window for a data log analysis while keeping a history of IP addresses allocated in the environment. The cloud server instances, being API-driven, may allow for relatively large changes to be made quickly. This factor may amplify the risk of credential compromise and, hence, may increase the desirability of a system that can quickly detect and mitigate such credential compromise.

The embodiments described herein may be configured to detect and mitigate such credential compromise and may do so without requiring an up-to-the-minute or up-to-the-second-accurate inventory of server instances. These embodiments may access a data table or data log of each server instance assumed role records built from the server instance logging data. Each table entry may show the instance ID, assumed role, IP address of the API call, and a TTL value that is designed to keep the table lean by identifying (and removing) expired entries. Using the IP address of the server instance that made the API call, the systems described herein may determine if the caller is an appropriate instance or a comprised source.

When a user launches a cloud server instance in web services with an IAM Role for permissions, the web services service may assume the role specified for the server instance and may pass those temporary credentials to a server instance metadata service. The system may then determine the resource name (RN) for the temporary instance credentials from this data log. In some embodiments, web services may refresh credentials in the metadata service at specified intervals (e.g., every 1-6 hours.). When the cloud server instance performs an "assume role" action (which will be explained further below with regard to FIG. 3), associated data may be logged in a data log including an instance identifier, an assumed role resource name, an IP address, and a TTL value.

For each "assume role" operation, the systems described herein may determine whether an entry already exists in the data log table and, if not, may create an entry. If the entry already exists, the system may update the TTL value to keep the entry alive. In some embodiments, the systems described herein may use the instance ID and an assumed role resource name as the identity in the data log for calls that use the temporary credentials. Once the table has the server instance identifiers and assume role resource names, the systems may begin analyzing the data log record for each cloud server instance that uses these temporary credentials. Each instance ID/session table entry may start without an IP address to lock to. As such, the systems herein may operate without needing to know beforehand every node in the network.

For each data log record, the systems may analyze the type of record to ensure that the data log record came from an assumed role. The systems may then extract the instance ID and do a lookup in the table to see if a corresponding entry exists. If so, the system may determine if there are any IP addresses that this assume role resource name is locked to. If there are no such assume role resource names, the systems may update the table with the source IP address from the server instance. This may become the IP address that API calls are to come from. If the systems described herein identify a call with a source IP address that is not this stored IP address, then the systems may have detected a credential not being used on the instance it was assigned to and may assume that those credentials have been compromised.

In some cases, the web services provider may make calls on a user's behalf using the user's credentials if certain API calls are made. The user may have a web services VPC endpoint for certain web services. The user may be able to attach a new elastic networking interface (ENI) or associate a new address to their server instance. In some cases, the user may attach additional ENIs to a server instance or associate a new address through use of an elastic IP (EIP). In such cases, the user may see additional IP addresses show up in data log records for the assumed role resource number. The user may account for these actions in order to prevent false positives. In some embodiments, the systems herein may inspect the data log records which associate new IP addresses to server instances and may create a table that has an entry for each time a new IP address was associated with the server instance. This may account for the number of potential IP address changes that are identified in the data log. If the system identifies a source IP address that does not match the user's lock IP, the systems herein may check to see if there was a call that resulted in a new IP address for the user's server instance. If there was such a call, the systems may add this IP address to the data log in the user's assume role resource name table entry. These systems may then remove the entry from any tables that track associations and may avoid issuing an alert.

Depending on the vector used to compromise the credentials initially, additional analyses (in addition to the IP address analysis) may be performed to detect credential compromise. In some cases, an attacker that finds a server-side request forgery (SSRF) vulnerability may attempt to cause an application to request the web services metadata service credential path. If successful, valid temporary web services credentials may be returned that are associated with the cloud server instance. These credentials may match the assume role resource number identified above. Using the same SSRF attack vector, the attacker may construct API requests to web services and may pass the API call uniform resource locator (URL). The systems herein may build a whitelist by enumerating user agent strings found in the networking environment to alert when deviations from the whitelist are detected. This process will be described in greater detail below initially with regard to FIGS. 2-4 and then with regard to method 500 of FIG. 5A and FIGS. 6-8.

Figure 2:
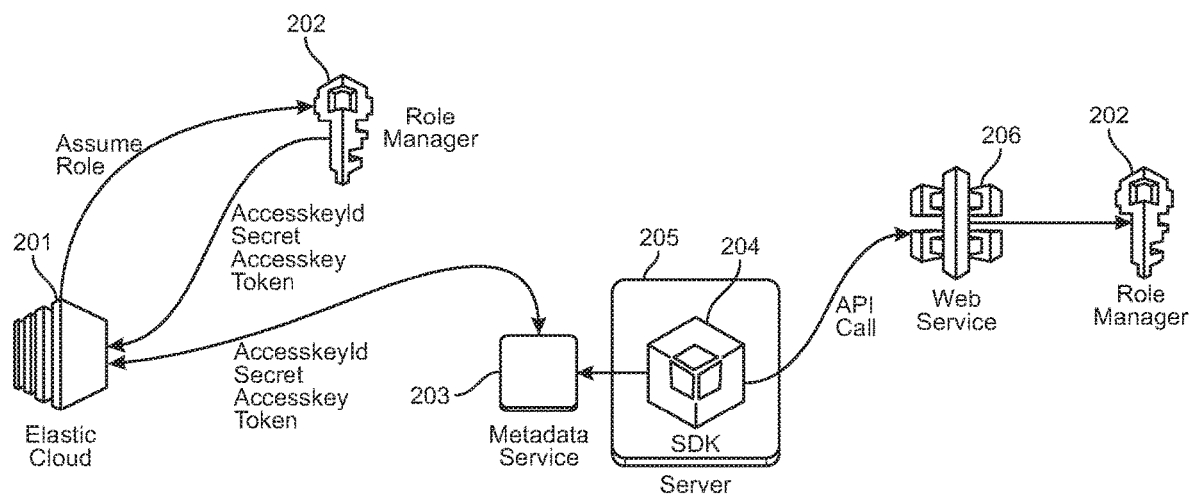
FIG. 2 illustrates a computing environment in which web services providers interact with a metadata service provider.

As shown in FIG. 2, various systems may be put into place to manage and distribute application credentials. As noted above, credential management systems may be designed to prevent credentials from being made available to unauthorized parties. The impact of exposed credentials may depend on the time of exposure, the skill of the individual with the credentials, and the privileges associated with the credentials. The combination of these can lead to anything from website defacement to a massive data breach where the businesses subjected to the breach may sustain heavy financial losses and may even be forced to discontinue business.

In the embodiments described herein, a "credential" may be any type of authentication data, token, or other indicator that is used to describe and/or make changes within an account (e.g., a web services account). In at least some of the embodiments herein, an entity (such as a user or business) may host one or more applications on the cloud. In FIG. 2, for example, these applications may be hosted on cloud server 205. These applications may need access to various cloud resources. Access to cloud resources may be controlled via metadata service 203 which may be designed to control access to network information and/or credentials. Some web service providers may provide the ability to assign permissions to a cloud instance through an identity and access management (IAM) role using a role manager 202. This role may be attached to a cloud server (e.g., 205) through an instance profile, thus providing credentials to the underlying applications running on the cloud instance through the metadata service 203.

The metadata service 203 may be a service provided by an entity that itself is configured to provide information for web services (e.g., 206) or applications deployed on cloud servers. As noted above, this metadata service information may include network information, cloud instance identifiers, credentials, or other information. In some cases, the metadata service information may be read-only and static. Each process with network access may be able to communicate with the metadata service by default. The metadata service 203 may include information indicating which availability-zone the user is deployed in, the user's private IP address, user data with which the user launched the cloud instance, and the web service credentials that the application uses for making API calls to the web service provider. These credentials may be temporary session credentials that range in a validity from one to six hours (or more).

When the expiration for the credentials nears, new session credentials may be generated and made available on the metadata service 203 for the application. This system may provide a substantially seamless experience with continuous access to web service APIs with limited-duration credentials. Software development kits (SDKs) 204 associated with the web service may be programmed to check the metadata service prior to credential expiration to retrieve the new set of dynamic credentials. The metadata service 203 may be accessible inside of the cloud server 205 using a specified IP address or other identifier.

In some cases, the web service provider may provide a logging service that logs API calls made by each application using credentials of a certain user or entity. This logging service may enable governance, compliance, and auditing. The logging service may identify which entity made the API call and from which location the API call was made. Static or dynamic credentials may be associated with a user in the web services identity access and management (IAM) service 202. The IAM service 202 may allow a user to generate up to two sets of credentials per IAM user. At least in some cases, these credentials may be static and may never expire. As such, the credentials may need to be manually rotated. Because these credentials may never expire, some entities may avoid the use of these credentials to mitigate risk if a credential were to be exposed.

Temporary or session-based credentials may be used when operating in the cloud. If a session-based credential is exposed, the potential impact of exposure may be reduced as the credential will eventually expire. Web service providers may associate session-based credentials with IAM roles. The lifecycle of credentials on cloud instances (e.g., 201) may be illustrated, at least partially, in FIG. 2. When a user launches a server 205 with an IAM role, the web service provider may create session credentials that are valid for a specified time period (e.g., 1-6 hours). The elastic cloud instance 201 may retrieve credentials for the metadata service 203 through an API call to a security token service (STS) that retrieves the temporary session credentials. These credentials may be passed on to the metadata service 203 that is relied upon by the cloud instance 201.

The web service SDK 204 may retrieve these credentials and use them when making API calls to web services 206. In the embodiments described herein, each API call may be evaluated by the IAM service (e.g., role manager 202) to determine if the role attached to the cloud server 205 has permission to make that call and if the temporary credential is still valid. If the role has permission and the token has not expired, the call may succeed. On the other hand, if the role does not have the permission or the token has expired, the call may fail. The cloud instance 201 may handle renewal of the credentials and may replace them in the metadata service 203.

In at least some embodiments, each temporary credential that is issued by the STS service may be given an expiration timestamp. When an API call is issued, the role manager 202 may validate that the credentials are still valid (not expired) and check the signature. If both validate, the API call may then be evaluated to see if the role has the given permissions assigned. As indicated further in FIG. 3, API calls may come from a variety of locations. In the embodiments described herein, the location from which the API call originated may be evaluated and used as a basis for allowing or denying the request.

Figure 3:
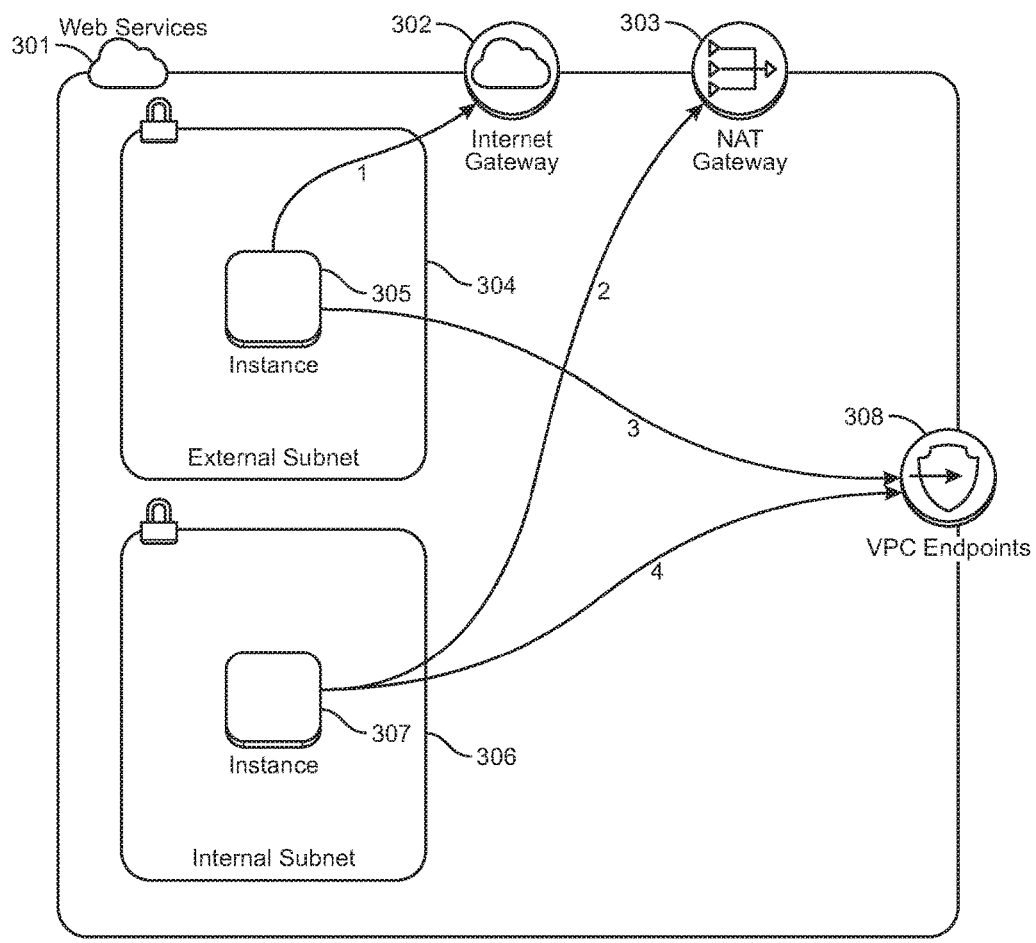
FIG. 3 illustrates a computing environment in which internal and external subnets within a network interact with a virtual private cloud (VPC).

FIG. 3 illustrates a networking environment in which API calls may originate from a variety of locations. At arrow 1, web services 301 may observe the public IP address of a user's cloud instance (e.g., 305) as the source IP address if the web services instance 305 is deployed in an external subnet (e.g., in a public network with a public IP address). This is because, at least in this embodiment, web services API calls may go directly to the internet 302. At arrow 2, web services 301 may observe the network address translation (NAT) gateway 303 public IP address as the source IP address. In such cases, a user's web services instance 307 may be deployed in an internal subnet 306 (e.g., a private network with no public IP address). This is because, at least in this embodiment, web services API calls may travel through the NAT Gateway 303 in order to get to a virtual private cloud (VPC) endpoint 308.

At arrow 3, web services 301 3 may observe the private IP address of a user's cloud instance as the source IP address and may also observe information about the VPC and/or VPC endpoint 308 the call went through if the user's web service instance 305 deployed in an external subnet 304 (e.g., a public network with a public IP address) makes a web services API call that goes through a VPC endpoint 308 or Private Link. At arrow 4, web services 301 may observe the private IP address of a user's cloud instance 307 as the source IP address as well as information about the VPC and/or VPC endpoint 308 the call went through if the user's web services cloud instance 307 deployed in an internal subnet 306 (e.g., a private network with no public IP address) makes a web services API call that goes through a VPC endpoint 308 or private link. Accordingly, in each of these four scenarios, the "location" of where an API call or metadata service request originates may be determined in a different manner.

As noted above, in at least some of the embodiments described herein, credentials may be enforced by only allowing API calls or other metadata service information requests to succeed if they originate from a known environment. In a web services environment, this may be achieved by creating an IAM policy that checks the origin of the API call. The systems described herein may be designed to create a managed policy that encompasses a user's entire account across all regions. To do this, the user would describe each region and collect NAT gateway IPs, VPC identifiers, and VPC endpoint IDs to create the policy language for the managed policy. These endpoints may then be attached to IAM Roles that are to be protected. In some embodiments, the user's web service may be exposed publicly through a load balancer. This may allow the user to deploy their cloud instance into the internal subnet and allow the user to attach this policy to their IAM role.

Figure 4:
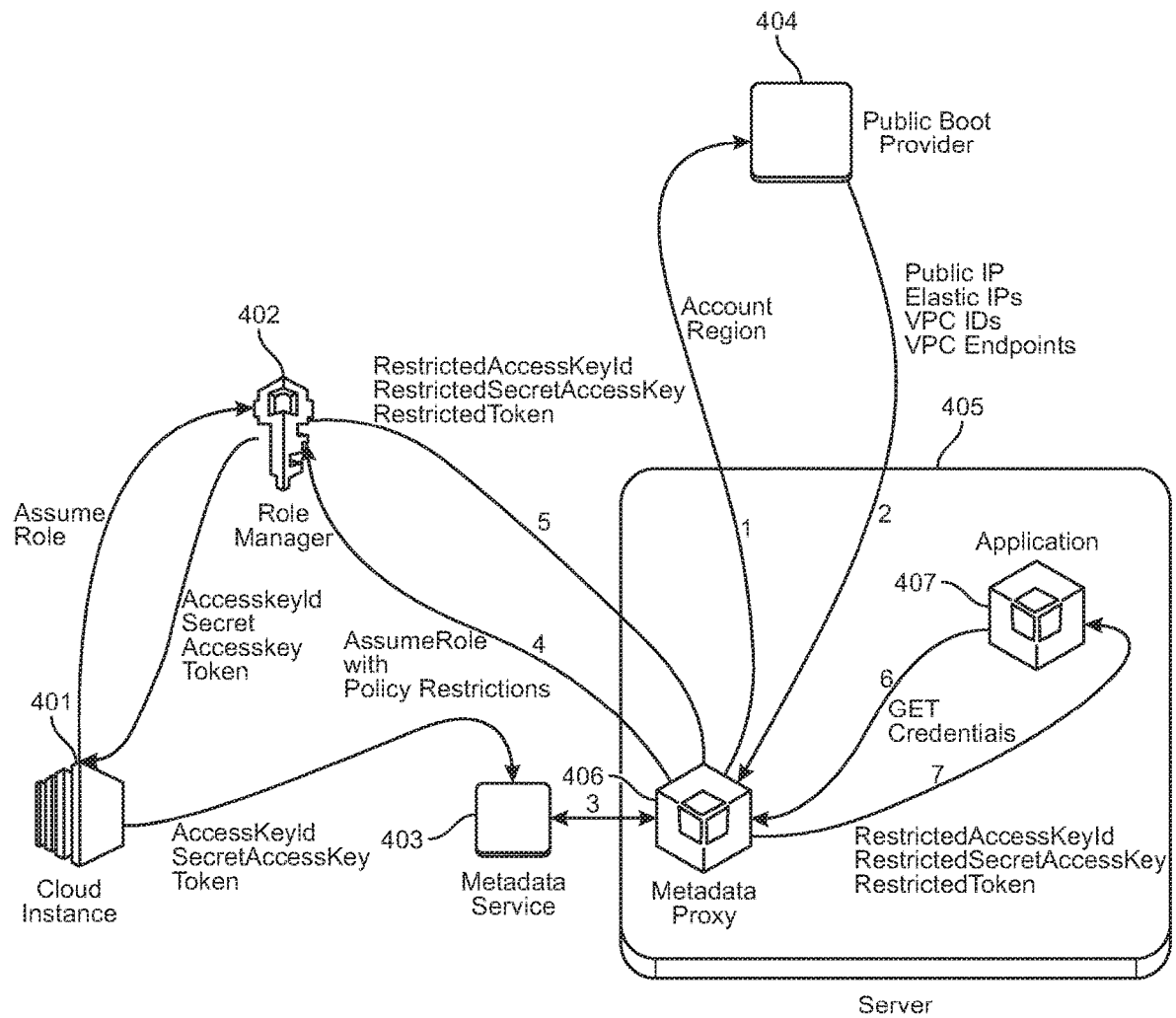
FIG. 4 illustrates a computing environment in which a metadata proxy interacts with a metadata service, a public boot provider, and other network nodes.

FIG. 4 describes an embodiment that provides credential enforcement by both locking credentials to an environment or location and using a metadata proxy to prevent credential compromise via a vulnerability class (e.g., Server-Side Request Forgery (SSRF)). In at least some embodiments, the computing architecture of FIG. 4 may be implemented to restrict credentials to a server or environment (e.g., a subnet) that can be applied to some or all cloud computing infrastructure. The embodiments described herein may provide a metadata proxy and service to applications running on a server (e.g., a web server or application server). The metadata proxy may interact with the server and, in the event that a credential is exposed or otherwise compromised, the credentials may be unable to work properly.

The diagram of FIG. 4 illustrates a boot process in which restricted credentials may be generated and promulgated. At step 1 in FIG. 4, the metadata proxy 406 may boot and request boot information from a public boot provider 404. The public boot provider 404 may send information about where the server 405 is deployed. For example, the information may include an account identifier (ID) and region associated with the server 405. Information such as cloud instance ID or other metadata on the server may be optionally sent as well. At step 2, the public boot provider 404 may respond with the public internet protocol (IP) address identified in the request as well as information relating to the environment in which the server 405 is deployed. This information may be regional or global to the account or entity. This process may contain the public IP address of the server requesting the information, virtual private cloud (VPC) IDs for the region or entity, VPC endpoint IDs for the region or entity, and/or potentially elastic IPs (static IPs assigned to the account that might be used by running services).

At step 3 in FIG. 4, the metadata proxy 406 may communicate with the metadata service 403 to determine which role the server is currently using (e.g., as prescribed by the role manager 402). At step 4, the metadata proxy 406 may perform an "assume role" operation for the role that was identified in step 3. When the "assume role" operation is called, the metadata proxy 406 may use the information from the public boot provider 404 to restrict where the credentials are valid. At step 5, the role manager 402 may provide the restricted credentials back to the metadata proxy 406 to provide to requesting applications 407 on the server 405. At step 6, the applications 407 on the server 405 may use a software development kit (SDK) or custom code to communicate with the metadata proxy 406 to request credentials. At step 7, the metadata proxy 406 may provide the restricted credentials back to the application(s) 407 so that the applications may access resources provided by the cloud instance 401. These steps may implement a trust relationship that defines which service, user, or role can perform an "assume role" operation for the currently used role as assigned by the role manager 402. In order to have the metadata proxy 406 protect the role deployed on the server 405, at least in some embodiments, the trust relationship may be updated to allow the role to perform an "assume role" operation into itself.

When the metadata proxy 406 performs an "assume role" operation to create restricted credentials to serve to applications, the metadata proxy may inject a sub-policy that restricts which locations (either physical or logical) the credentials are valid from. The sub-policy may include a restriction where any actions are denied when the conditions are not met. The sub-policy may also include a statement that allows all actions. When doing sub-policy injection, the metadata proxy may be provided with a scoped subset of what the server's assigned role already has. In some cases, by default, some or all original permissions that the role has may be assumed. The sub-policy may also include a denying statement that denies the action of the "assume role" operation to the cloud instance role. As such, only the metadata proxy may be able to assume the role that the server is running as. At least in some cases, if this denying statement is not provided, another user may use the credentials to perform an "assume role" operation to the same role without sub-policy injection and remove the restrictions. With this sub-policy, the metadata proxy 406 may create credentials that are restricted to the environment described by the policy. This may result in credentials that are restricted to a single cloud instance (if deployed in an external subnet, talking directly to the internet), or may be restricted to the internal subnet or availability-zone where routing to the internet goes through a NAT Gateway.

Combining the idea of credential enforcement and restriction and implementation of a metadata proxy may result in highly granular levels of control regarding where credentials are valid in a given network environment. Moreover, the credential enforcement and metadata proxy may limit where the credentials may be used (i.e., to a single running cloud instance). If a credential exposure or compromise ever occurs, the credentials may be invalid outside of the running cloud instance. This method may mitigate credential theft vulnerabilities and may reduce the ability of attackers to utilize stolen credentials without fully compromising a cloud instance.

Figure 5A:
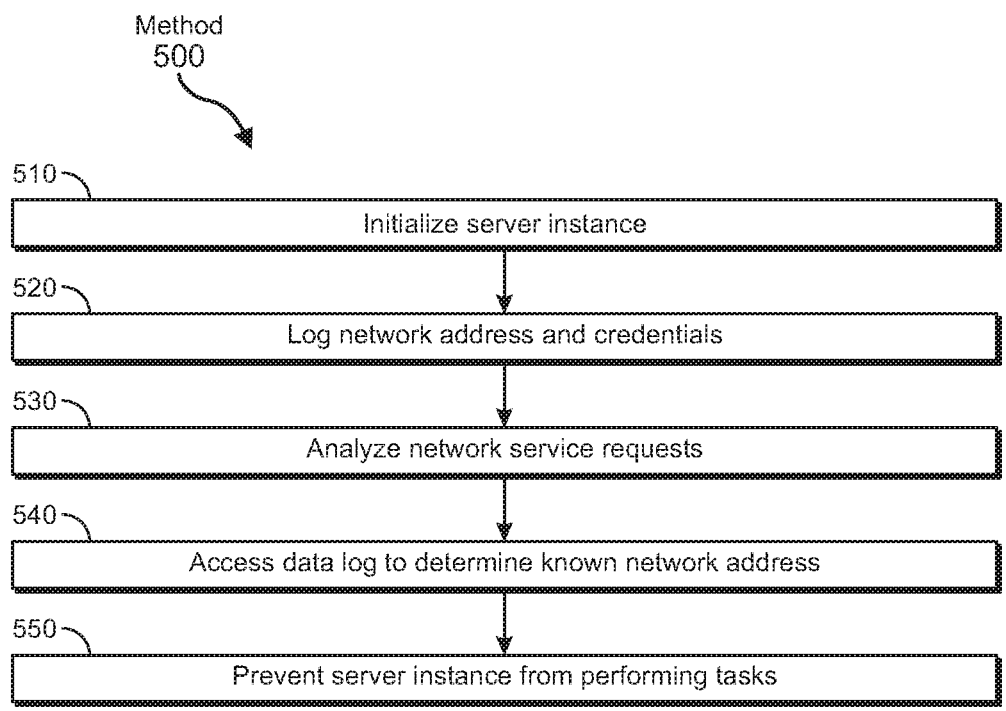
FIG. 5A illustrates a flow diagram of an exemplary method for detecting credential compromise in a cloud environment.

FIG. 5A is a flow diagram of an exemplary computer-implemented method 500 for detecting credential compromise in a cloud server instance. The timing diagram 555 in FIG. 5B may illustrate one embodiment in which the order and timing of steps of FIG. 5A may be performed. The steps shown in FIG. 5A may be performed by any suitable computer-executable code and/or computing system, including the system illustrated in FIG. 1. In one example, each of the steps shown in FIG. 5A may represent an algorithm whose structure includes and/or is represented by multiple sub-steps, examples of which will be provided in greater detail below.

As illustrated in FIG. 5A, at step 510 of method 500 one or more of the systems described herein may initialize a server instance using a specified network address and an associated set of credentials. For example, at time T1 of FIG. 5B, server instance initializer 108 of FIG. 1 may initialize server instance 120A and/or server instance 120B using specified network addresses 110A/110B and credentials 111A/111B. In some cases, the server instances may be initialized using a first network address and then may be transitioned to a different address. Each of these assigned network addresses may be logged by the logging module 108.

Figure 5B:
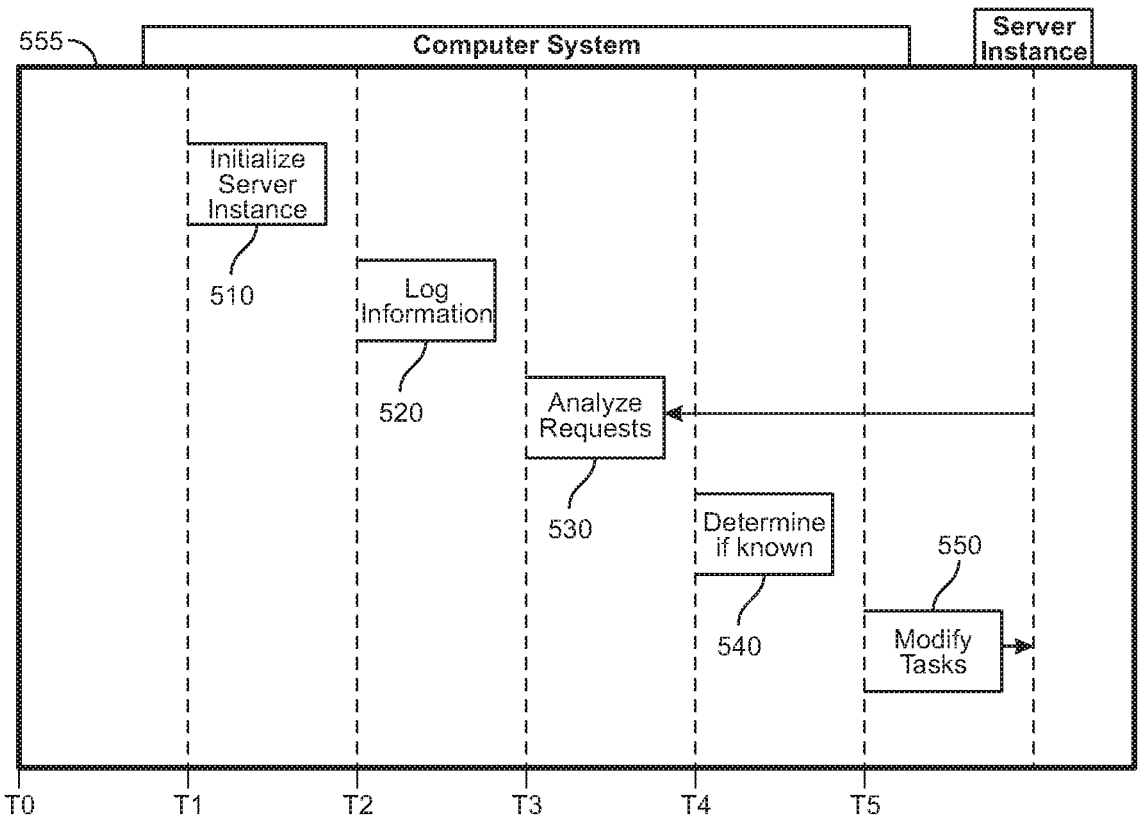
FIG. 5B illustrates a timing diagram of the exemplary method for detecting credential compromise in a cloud environment.

The logging module 108 of computer system 101 may be configured, at time T2 of FIG. 5B, to log the network addresses of the initialized server instances as well as the associated set of credentials in a data log 109 at step 520. The data log 109 may include various types of information including network address 110, credentials 111, and potentially other information including internet protocol (IP) block and time-to-live (TTL) value that indicates the length of time for which the credentials are valid. The data log 109 may be stored on computer system 101 or may be stored on a remote data storage system such as a cloud data store. The data log 109 may include live, real-time data as well as historical data indicating, for a specified time period, which server instances were initialized with which network addresses and associated credentials. In some cases, the real-time data may show information for those server instances that are currently running, and the historical data may show information for server instances that are no longer running or were initialized at least some minimum threshold time in the past.

At step 530, the service request analyzer 112 of computer system 101 may analyze network service requests 116 to determine that a different server instance with a different network address is requesting a network service using the same set of credentials. For instance, the service request analyzer 112 may access, at time T3, one or more network service requests 116 that are sent to computer system 101 and may determine, based on information included in the requests such as server instance name, network address and credentials, that a server instance with a different network address is requesting a network service using the same set of credentials as a server instance that is already running. The data log analyzer 113 of computer system may then access the data log 109, at step 540, to determine whether the second server instance is using a network address that is known to be valid within the network (e.g., is stored in the known valid network addresses 114). If the data log analyzer 113 determines at time T4 that the second server instance is not using a known network address, the task modification module 115 may, at step 550, prevent the second server instance from performing various tasks within the network.

Thus, if a first server instance (e.g., 120A) is initialized using network address 110A and credentials 111A, and server instance 120B tries to access private information using credentials 111A, the data log analyzer 113 may look to see whether server instance 120B's network address 110B is a known valid network address 114. If the network address 110B is a known valid address, it may be acceptable to use the same credentials 111A used by another server instance (instance 120A in this case). However, if the server instance 120B is using an unknown network address that either hasn't been logged before, or has been previously logged and is known not to be valid (e.g., not owned by the network owner or operator), then the task modification module 115 may, at time T5 in FIG. 5B, place limits on what that server instance is allowed to do and which data it is allowed to access and which data it is prevented from accessing. In some cases, in addition to (or as an alternative to) placing limits on what the server instance is allowed to do, the system may generate an alert that is sent to one or more administrators or other entities indicating that the credentials 111A may be compromised.

FIG. 6 illustrates an embodiment of a data log 600. This data log 600 may be the same as or different than data log 109 of FIG. 1. The data log 600 may include multiple different fields including, but not limited to, server instance identifier 620, credential name or identifier 621, IP address or IP block 622, and time-to-live (TTL) 623. The server instance identifier field 620 may identify server instance identifiers including 601, 602, 603, 604, and others such as server instances 120A and 120B of FIG. 1. Each server instance identifier may be unique to that server instance. Each server instance may have a credential name 621 or other credential identifier such as "ABC," "DEF," "GHI," or "JKL." The credential identifier may identify the type of credential or may be a hash derivative of the credential or may be the actual credential used when requesting network services. The IP block 622 may represent substantially any network address identifier or, in the embodiment shown in FIG. 6, may show which IP block (e.g., 610, 611, 612, 613, etc.) the request 116 was received from. The TTL value 623 may indicate how long each credential is valid. Each credential may be temporary or static. Static credentials may not have a TTL value, but temporary credentials (which are more commonly used) may each be set to expire after a given time. This may limit the amount of damage a malicious user could do if the malicious user somehow gained access to a valid credential.

Thus, server instances may be initialized with static credentials or temporary credentials. In like manner, a server instance may be initialized with a temporary network address and may be transitioned to a static, public-facing network address. In such cases, both the temporary network address and the static network addresses may be part of the known valid network addresses 114. Similarly, if a server instance includes both temporary and static credentials, both sets of credentials may be stored in the data log 109 as known valid credentials. The computer system 101 may be configured to associate the temporary credentials with the static credentials or associate the temporary network address with the static, public-facing network address. As such, over time, the computer system 101 may identify and approve temporary and static network addresses and corresponding credentials.

In some embodiments, the computer system 101 may even allow a network address or IP block to have a deviation from the stored network address. For example, if an existing IP address ends in 613, the computer system may approve another network address that ends in 614. This information may be included in the data log 600. Thus, the computer system may create a new row or new entry in the data log or network address table that includes the network address with the deviation from the network addresses already stored in the data log. In some cases, the computer system 101 may allow multiple different network addresses from the same server instance for at least a specified time frame. For example, the computer system 101 may log and approve a server instance to have two IP addresses for a specified time window. After this time window has expired, at least one of the IP addresses may no longer be valid. The computer system 101 may then update the data log to indicate that the secondary IP address for that server instance is no longer valid.

The data log 600 may include real-time data and/or historical data. For instance, the data log 600 may include server instance identifiers and other associated information for server instances that are currently running in the network. The data log 600 may also include information for past server instances that are potentially no longer running. In cases where the data log 600 includes real-time data, the step of accessing the data log to determine whether the second server instance is using a network address that is known to be valid within the network may be performed using real-time data. In cases where the data log 600 includes historical data, the step of accessing the data log to determine whether the second server instance is using a network address that is known to be valid within the network may be performed using stored historical data. In other cases, the data log 600 may include both real-time data and historical data. Such a data log may thus provide information regarding both currently running server instances and previously initialized server instances.

As noted above, computer system 101 may be configured to maintain a set of network addresses 114 that are known to be valid within the network. These known valid network addresses may include network addresses that were assigned out, for example, by the server instance initializer 107 when the server instances 120A/120B were first initialized. Additionally or alternatively, the known valid network addresses 114 may include network addresses that were stored in the data log 109 during a specified timeframe. For example, as server instances send network service requests 116, the network addresses and credentials of those server instances may be stored in the data log 109. Over time, certain network addresses may be recognized from previous entries in the data log and, as such, may be included as part of the known valid network addresses 114.

Figures 7, 8:
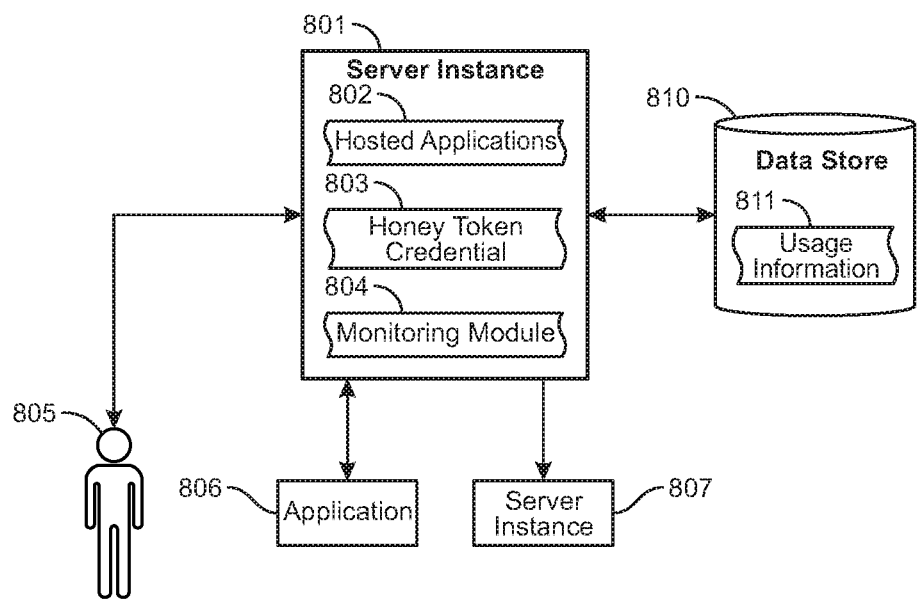
FIG. 7 illustrates an embodiment in which a sliding window of historical data is identified.
FIG. 8 illustrates an environment in which honeytoken credentials are provided and monitored for use.

In some cases, as shown in FIG. 7, a data log 700 may include many different entries for server instances (e.g., 701-710). Each server instance may have credentials with a TTL value. For example, server instance 701 has a TTL value of five hours and 58 minutes, and server instance 702 has a TTL value of five hours and 17 minutes. Going further down the list in the data log 700, the TTL decreases until coming to server instance 710 whose credentials are only valid for six more minutes. In some embodiments, the list of known valid network addresses 114 may include those data log entries that are within a sliding window of history (e.g., 720). The sliding window 720 may include data log entries that have a TTL value of between five and two hours. In the data log shown in FIG. 7, the sliding window 720 takes in server instances 703-707. As time goes by, the sliding window may be continually updated to include new server instances and to remove old server instances. The sliding window 720 identifying which server instances are known to be valid may be fully configurable and customizable by a user or administrator. The sliding window 720 may, for example, be configured to include very recently initialized server instances (e.g., 701) or server instances whose credentials are nearly expired (e.g., 710). The sliding window may be specific to each network and may be variable in size to include more or fewer server instances.

Turning now to FIG. 8, a server instance 801 may be provided. The server instance may be the same as or different than the server instances 120A/120B of FIG. 1. The server instance 801 may be configured to host one or more applications 802. The server instance 801 may also be configured to host a honeytoken credential 803 and monitor that honeytoken credential for potential usage by other server instances. For example, the honeytoken credential 803 may appear to be a normal credential that could possibly be used to access cloud resources. A potentially malicious user (e.g., 805) may be able to scan for such credentials and see the honeytoken credential 803. This honeytoken credential, however, may be placed on the server instance 801 for the specific purpose of catching a malicious user. Once the malicious user finds the honeytoken credential 803 on the server instance 801, that user may attempt to use the honeytoken credential to access various cloud resources. The honeytoken credential 803 may be used by a user 805, an application 806, a server instance 807, or by another entity. The monitoring module 804 of server instance 801 may be configured to monitor which entities are using the honeytoken credential 803 and note the usage information 811 in a local or remote data store 810.

The computer system 101 of FIG. 1 may be configured to generate the honeytoken credential 803 and place it on the server instance 801. In some embodiments, the honeytoken credential 803 may be a static key that assumes a temporary credential. Once the honeytoken credential 803 is established and made available, the monitoring module 804 may track usage of that credential. Then, when the honeytoken credential 803 is initially used by a server instance (e.g., 807) or by an application (e.g., 806), various portions of information 811 tied to the server instance or application may be recorded. In some cases, the recorded information may be similar to or the same as that recorded in data log 600 of FIG. 6 including server instance identifier, credential name, IP block, and TTL value. Thus, using the honeytoken credential 803, the embodiments described herein may identify which server instance (among many hundreds or thousands of server instances) used the honeytoken credentials.

Upon detecting that the honeytoken credentials 803 have been used, the computer system 101 of FIG. 1 may provide a null response to the requesting application or server instance. Alternatively, the computer system 101 may provide a response with fictitious data to evaluate how the fictitious data is used. In some cases, the type of fictitious data supplied in the reply may be based on which type of server instance sent the network service request. If, for example, the server instance was of type A, the reply may include fictitious data A, and if the server instance was of type B, the reply may include fictitious data B, and so on. After the fictitious data has been provided to the requesting server instance, the monitoring module 804 may further monitor the server instance and store the further usage information 811 in the data store 810.

In some embodiments, the computer system 101 may issue certificates for honeypot services and may host the honeypot services on a custom application. Like the honeytoken credentials 803 described above, a honeypot service may be one designed to attract malicious users. The computer system 101 may issue a secure sockets layer (SSL) certificate, for example, that shows the certificates created by each certificate authority (CA). The computer system may also issue a certificate for a honeypot service and host that service with a customized application. The customized application may be designed to detect any calls to it and flag the calls as originating from a potentially malicious user. Thus, any would-be attackers that scan a CA log and find the honeypot service and send a call to the honeypot service may be exposed and may cause the customized application to trigger an alert.

This honeypot service may thus act as a tripwire where, as soon as a server instance or application has made a call to the honeypot service hosted on the custom application, that application may alert various entities of the call made to the honeypot service by the server instance or application. Any replies to the call may be null replies or may include fictitious information. Moreover, as with the honeytoken credentials, any replies to the server instance or application that made the call may be dependent on the type of service to which the call was made. Thus, depending on the application the attacker was trying to access, the honeypot service may return the information the attacker would expect to receive from that service. Then, after the information was sent, the honeypot service may alert the various entities. Accordingly, honeytoken credentials and honeypot services may be used to identify malicious users, to track their activities within a network, and to alert the proper entities of a potential intruder within the network.

A corresponding system for detecting credential compromise in a cloud server instance may also be provided. The system may include at least one physical processor and physical memory comprising computer-executable instructions that, when executed by the physical processor, cause the physical processor to initialize a server instance using a specified network address and an associated set of credentials, log the network address of the initialized server instance as well as the associated set of credentials in a data log, analyze network service requests to determine that a different server instance with a different network address is requesting a network service using the same set of credentials, access the data log to determine whether the second server instance is using a network address that is known to be valid within the network and, upon determining that the second server instance is not using a known network address, prevent the second server instance from performing various tasks within the network.

In some examples, the above-described method may be encoded as computer-readable instructions on a computer-readable medium. For example, a computer-readable medium may include one or more computer-executable instructions that, when executed by at least one processor of a computing device, may cause the computing device to initialize a server instance using a specified network address and an associated set of credentials, log the network address of the initialized server instance as well as the associated set of credentials in a data log, analyze network service requests to determine that a different server instance with a different network address is requesting a network service using the same set of credentials, access the data log to determine whether the second server instance is using a network address that is known to be valid within the network and, upon determining that the second server instance is not using a known network address, prevent the second server instance from performing various tasks within the network.

1. A computer-implemented method for detecting credential compromise in a cloud server instance, the method comprising: initializing a server instance using a specified network address and an associated set of credentials; logging the network address of the initialized server instance as well as the associated set of credentials in a data log; analyzing one or more network service requests to determine that a different server instance with a different network address is requesting a network service using the same set of credentials; accessing the data log to determine whether the second server instance is using a network address that is known to be valid within the network; and upon determining that the second server instance is not using a known network address, preventing the second server instance from performing one or more specified tasks within the network.

2. The computer-implemented method of claim 1, wherein the server instance is configured to maintain a set of network addresses that are known to be valid within the network.

3. The computer-implemented method of claim 2, wherein the set of network addresses that are known to be valid within the network include a plurality of network addresses that were stored in the data log during a specified timeframe.

4. The computer-implemented method of claim 3, wherein the specified timeframe is continually updated such that those network addresses that are stored in the data log are stored within a sliding window of history.

5. The computer-implemented method of claim 1, wherein the data log is configured to store at least one of the following for each server instance: a credential name, an internet protocol (IP) block or a time-to-live (TTL) value.

6. The computer-implemented method of claim 1, wherein the set of credentials associated with the initialized server instance includes at least one of static credentials or temporary credentials.

7. The computer-implemented method of claim 1, wherein the server instance is initialized using a temporary network address and is transitioned to a static, public-facing network address.

8. The computer-implemented method of claim 7, further comprising associating the temporary network address with the static, public-facing network address and approving the static, public-facing network address as a known valid network address.

9. The computer-implemented method of claim 1, further comprising creating a network address table that allows network addresses to have at least one deviation from the network address stored in the data log.

10. The computer-implemented method of claim 1, further comprising allowing multiple different network addresses from the same server instance for at least a specified time frame.

11. A system comprising: at least one physical processor; and physical memory comprising computer-executable instructions that, when executed by the physical processor, cause the physical processor to: initialize a server instance using a specified network address and an associated set of credentials; log the network address of the initialized server instance as well as the associated set of credentials in a data log; analyze one or more network service requests to determine that a different server instance with a different network address is requesting a network service using the same set of credentials; access the data log to determine whether the second server instance is using a network address that is known to be valid within the network; and upon determining that the second server instance is not using a known network address, prevent the second server instance from performing one or more specified tasks within the network.

12 The system of claim 11, wherein the data log includes real-time data, such that the step of accessing the data log to determine whether the second server instance is using a network address that is known to be valid within the network is performed using real-time data.

13. The system of claim 11, wherein the data log includes historical data, such that the step of accessing the data log to determine whether the second server instance is using a network address that is known to be valid within the network is performed using stored historical data.

14. The system of claim 11, further comprising generating a honeytoken credential and placing that honeytoken credential on the server instance.

15. The system of claim 14, further comprising tracking usage of the honeytoken credential, such that upon an initial use by a server instance or application, one or more portions of information tied to the server instance or application are recorded.

16. The system of claim 15, further comprising providing a null response or providing a response with fictitious data to evaluate how the fictitious data is used.

17. The system of claim 11, further comprising issuing one or more certificates for one or more honeypot services and hosting the one or more honeypot services on a custom application.

18. The system of claim 17, further comprising: determining that a server instance or application has made a call to at least one of the honeypot services hosted on the custom application; and alerting one or more entities of the call made to the honeypot service by the server instance or application.

19. The system of claim 18, further comprising replying to the call to the honeypot services, wherein the reply is dependent on the type of service to which the call was made.

20. A non-transitory computer-readable medium comprising one or more computer-executable instructions that, when executed by at least one processor of a computing device, cause the computing device to: initialize a server instance using a specified network address and an associated set of credentials; log the network address of the initialized server instance as well as the associated set of credentials in a data log; analyze one or more network service requests to determine that a different server instance with a different network address is requesting a network service using the same set of credentials; access the data log to determine whether the second server instance is using a network address that is known to be valid within the network; and upon determining that the second server instance is not using a known network address, prevent the second server instance from performing one or more specified tasks within the network.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data to be transformed, transform the data, output a result of the transformation to detect credential compromise, use the result of the transformation to mitigate the harm caused by credential compromise, and store the result of the transformation to track the results. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

We claim:

1. A computer-implemented method for detecting credential compromise in a cloud server instance, the method comprising:
    initializing a server instance using a specified network address and an associated set of credentials;
    logging the network address of the initialized server instance as well as the associated set of credentials in a data log, the data log including a sliding window of history that includes one or more log entries from different server instances, the sliding window being continually updated to include new server instances and remove previous server instances;
    analyzing one or more network service requests to determine that a different server instance with a different network address is requesting a network service using the same set of credentials;
    accessing the server instances identified in the sliding window of the data log to determine whether the second server instance is using a network address that is known to be valid within the network; and
    upon determining that the second server instance is not using a known network address, identifying one or more tasks the second server instance is attempting to perform and allowing the second server instance to perform at least one of the identified tasks while restricting the second server instance from performing at least one of the identified tasks within the network.

2. The computer-implemented method of claim 1, wherein the server instance is configured to maintain a set of network addresses that are known to be valid within the network.

3. The computer-implemented method of claim 2, wherein the set of network addresses that are known to be valid within the network include a plurality of network addresses that were stored in the data log during a specified timeframe.

4. The computer-implemented method of claim 3, wherein the specified timeframe is continually updated such that those network addresses that are stored in the data log are stored within a sliding window of history.

5. The computer-implemented method of claim 1, wherein the data log is configured to store at least one of the following for each server instance: a credential name, an internet protocol (IP) block or a time-to-live (TTL) value.

6. The computer-implemented method of claim 1, wherein the set of credentials associated with the initialized server instance includes at least one of static credentials or temporary credentials.

7. The computer-implemented method of claim 1, wherein the server instance is initialized using a temporary network address and is transitioned to a static, public-facing network address.

8. The computer-implemented method of claim 7, further comprising associating the temporary network address with the static, public-facing network address and approving the static, public-facing network address as a known valid network address.

9. The computer-implemented method of claim 1, further comprising creating a network address table that allows network addresses to have at least one deviation from the network address stored in the data log.

10. The computer-implemented method of claim 1, further comprising allowing multiple different network addresses from the same server instance for at least a specified time frame.

11. A system comprising:
    at least one physical processor; and
    physical memory comprising computer-executable instructions that, when executed by the physical processor, cause the physical processor to:
        initialize a server instance using a specified network address and an associated set of credentials;
        log the network address of the initialized server instance as well as the associated set of credentials in a data log, the data log including a sliding window of history that includes one or more log entries from different server instances, the sliding window being continually updated to include new server instances and remove previous server instances;
        analyze one or more network service requests to determine that a different server instance with a different network address is requesting a network service using the same set of credentials;

access the server instances identified in the sliding window of the data log to determine whether the second server instance is using a network address that is known to be valid within the network; and upon determining that the second server instance is not using a known network address, identify one or more tasks the second server instance is attempting to perform and allow the second server instance to perform at least one of the identified tasks while restricting the second server instance from performing at least one of the identified tasks within the network.

12. The system of claim 11, wherein the data log includes real-time data, such that the step of accessing the data log to determine whether the second server instance is using a network address that is known to be valid within the network is performed using real-time data.

13. The system of claim 11, wherein the data log includes historical data, such that the step of accessing the data log to determine whether the second server instance is using a network address that is known to be valid within the network is performed using stored historical data.

14. The system of claim 11, further comprising generating a honeytoken credential and placing that honeytoken credential on the server instance.

15. The system of claim 14, further comprising tracking usage of the honeytoken credential, such that upon an initial use by a server instance or application, one or more portions of information tied to the server instance or application are recorded.

16. The system of claim 15, further comprising providing a null response or providing a response with fictitious data to evaluate how the fictitious data is used.

17. The system of claim 11, further comprising issuing one or more certificates for one or more honeypot services and hosting the one or more honeypot services on a custom application.

18. The system of claim 17, further comprising:

determining that a server instance or application has made a call to at least one of the honeypot services hosted on the custom application; and alerting one or more entities of the call made to the honeypot service by the server instance or application.

19. The system of claim 18, further comprising replying to the call to the honeypot services, wherein the reply is dependent on the type of service to which the call was made.

20. A non-transitory computer-readable medium comprising one or more computer-executable instructions that, when executed by at least one processor of a computing device, cause the computing device to:

initialize a server instance using a specified network address and an associated set of credentials;

log the network address of the initialized server instance as well as the associated set of credentials in a data log, the data log including a sliding window of history that includes one or more log entries from different server instances, the sliding window being continually updated to include new server instances and remove previous server instances;

analyze one or more network service requests to determine that a different server instance with a different network address is requesting a network service using the same set of credentials;

access the server instances identified in the sliding window of the data log to determine whether the second server instance is using a network address that is known to be valid within the network; and upon determining that the second server instance is not using a known network address, identify one or more tasks the second server instance is attempting to perform and allow the second server instance to perform at least one of the identified tasks while restricting the second server instance from performing at least one of the identified tasks within the network.

* * * * *